US012639065B2

(12) United States Patent　　　　(10) Patent No.:　US 12,639,065 B2
　　Kumar　　　　　　　　　　　　　　　(45) Date of Patent:　May 26, 2026

(54) MANAGING SECURITY APPROVAL OF SERVICES DEPLOYED IN CLOUD PLATFORM USING AN EXTENSIBLE PLATFORM AS A SERVICE

(71) Applicant: Salesforce, Inc., San Francisco, CA (US)

(72) Inventor: Mayank Kumar, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 141 days.

(21) Appl. No.: 18/670,977

(22) Filed: May 22, 2024

(65) Prior Publication Data

US 2024/0311144 A1　　Sep. 19, 2024

Related U.S. Application Data

(63) Continuation of application No. 17/589,497, filed on Jan. 31, 2022, now Pat. No. 12,014,171.

(Continued)

(51) Int. Cl.
　　*G06F 8/71*　　　　(2018.01)
　　*G06F 8/65*　　　　(2018.01)
　　　　(Continued)

(52) U.S. Cl.
　　CPC ................. *G06F 8/71* (2013.01); *G06F 8/65* (2013.01); *G06F 9/54* (2013.01); *G06F 11/3684* (2013.01);
　　　　(Continued)

(58) Field of Classification Search
　　CPC .............. G06F 21/577; G06F 21/6218; G06F 2221/033
　　　　(Continued)

(56) References Cited

U.S. PATENT DOCUMENTS 6,915,507　B1 *　7/2005　Kaler ..................... G06F 16/93
　　　　　　　　　　　　　　　　　　　　　　717/103
8,566,949　B2 *　10/2013　Ikeda ................... G06F 21/121
　　　　　　　　　　　　　　　　　　　　　　713/193

(Continued)

OTHER PUBLICATIONS

Wang, "Towards PaaS Using Service-Oriented Component Model", 2010, ACM (Year: 2010).*

(Continued)

*Primary Examiner* — Badri Narayanan Champakesan
(74) *Attorney, Agent, or Firm* — Kowert, Hood, Munyon, Rankin & Goetzel, P.C.; Mark D. Seegers; Dean M. Munyon

(57) ABSTRACT

An extensible platform-as-a-service (PaaS) system is used during the software development lifecycle (SDLC) processes of an application. The system facilitates the process of getting security approval for the application. The system allows developers to use software bundles including software modules that are pre-approved. The system allows a developer to customize one or more software modules of the software bundle if necessary. The system monitors the development of the application to check if the developer customizes any software module to use a configuration that is not pre-approved. The system automatically generates a report noting the customization to the software module and requests the security team to review the modified configuration for security approval.

15 Claims, 10 Drawing Sheets

Related U.S. Application Data

(60) Provisional application No. 63/256,046, filed on Oct. 15, 2021.

(51) Int. Cl.

| | |
|---|---|
| *G06F 9/54* | (2006.01) |
| *G06F 11/36* | (2025.01) |
| *G06F 11/3668* | (2025.01) |
| *G06F 21/57* | (2013.01) |
| *G06F 21/62* | (2013.01) |

(52) U.S. Cl.
CPC ...... *G06F 11/3688* (2013.01); *G06F 11/3692* (2013.01); *G06F 21/577* (2013.01); *G06F 21/6218* (2013.01); *G06F 2221/033* (2013.01)

(58) Field of Classification Search
USPC .......................................................... 726/25
See application file for complete search history.

(56) References Cited

U.S. PATENT DOCUMENTS

| | | | | |
|---|---|---|---|---|
| 8,645,977 | B2 * | 2/2014 | Jacobson | G06F 9/45537 |
| | | | | 719/328 |
| 9,558,098 | B1 * | 1/2017 | Alshayeb | G06F 11/3604 |
| 11,206,281 | B2 * | 12/2021 | Segal | H04L 63/1441 |
| 11,436,127 | B1 * | 9/2022 | Raghavendran | G06F 11/368 |
| 11,537,716 | B1 * | 12/2022 | Choudhary | H04L 63/14 |
| 11,593,500 | B1 * | 2/2023 | Coenders | G06Q 10/06315 |
| 11,727,117 | B2 * | 8/2023 | Shah | G06F 8/71 |
| | | | | 726/25 |
| 12,456,293 | B2 * | 10/2025 | Zuniga | G06V 30/414 |
| 2002/0108099 | A1 * | 8/2002 | Paclat | G06F 8/24 |
| | | | | 717/102 |
| 2005/0144615 | A1 * | 6/2005 | Chen | G06F 8/20 |
| | | | | 717/169 |
| 2007/0143851 | A1 * | 6/2007 | Nicodemus | G06F 11/3495 |
| | | | | 726/4 |
| 2009/0106844 | A1 * | 4/2009 | Yoon | H04L 41/08 |
| | | | | 726/25 |
| 2010/0313182 | A1 * | 12/2010 | Chen | G06F 8/38 |
| | | | | 717/109 |
| 2012/0102451 | A1 * | 4/2012 | Kulkarni | G06F 8/24 |
| | | | | 717/102 |
| 2012/0159423 | A1 * | 6/2012 | Becker | G06F 9/44526 |
| | | | | 717/102 |
| 2016/0127454 | A1 * | 5/2016 | Maheshwari | H04L 41/20 |
| | | | | 709/223 |
| 2016/0337474 | A1 * | 11/2016 | Rao | H04L 41/12 |
| 2016/0344590 | A1 * | 11/2016 | Huey | H04Q 11/0071 |
| 2018/0373520 | A1 * | 12/2018 | Lim | H04L 41/082 |
| 2021/0240818 | A1 * | 8/2021 | Seksenov | G06F 16/986 |
| 2021/0289435 | A1 * | 9/2021 | Li | H04W 48/16 |
| 2022/0100632 | A1 * | 3/2022 | Kulkarni | G06F 18/23213 |
| 2022/0109718 | A1 * | 4/2022 | Henley | H04L 67/02 |
| 2022/0253297 | A1 * | 8/2022 | Wallis | H04L 67/34 |
| 2023/0058197 | A1 * | 2/2023 | Comer | G06F 9/44505 |
| 2023/0119962 | A1 * | 4/2023 | Kumar | G06F 11/3692 |
| | | | | 717/102 |

OTHER PUBLICATIONS

Wettinger, "Enabling Dynamic Deployment of Cloud Applications Using a Modular and Extensible PaaS Environment", 2013, IEEE ( Year: 2013).*

Wang, T. et al., "Towards PaaS Using Service-Oriented Component Model," Proceedings of the Second Asia-Pacific Symposium on Internetware, Nov. 3, 2010, pp. 1-4.

Wettinger, J. et al., "Enabling Dynamic Deployment of Cloud Applications Using a Modular and Extensible PaaS Environment," Sixth International Conference on Cloud Computing. IEEE, Jun. 28, 2013, pp. 478-485.

* cited by examiner

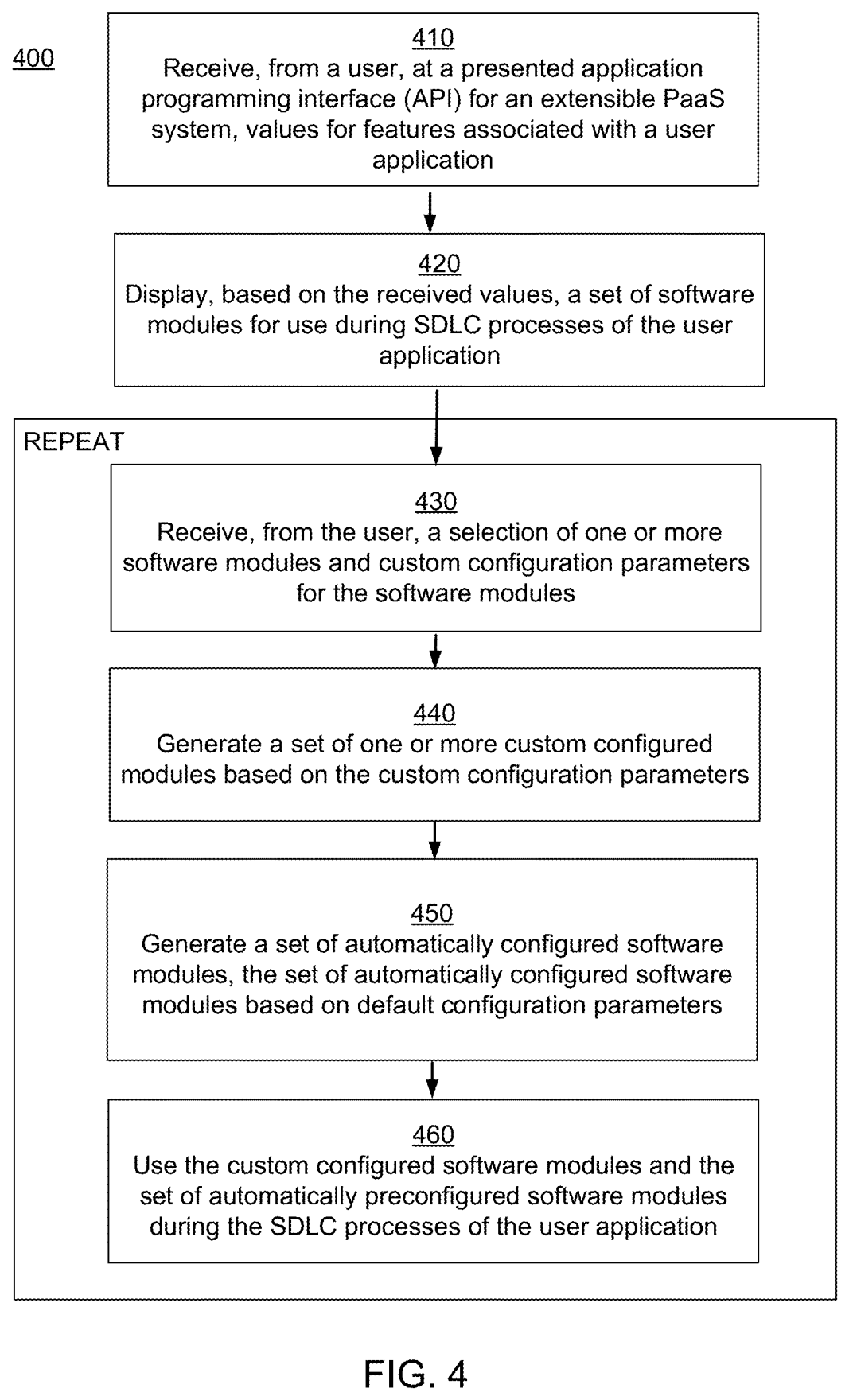

400

410
Receive, from a user, at a presented application programming interface (API) for an extensible PaaS system, values for features associated with a user application

420
Display, based on the received values, a set of software modules for use during SDLC processes of the user application

REPEAT

430
Receive, from the user, a selection of one or more software modules and custom configuration parameters for the software modules

440
Generate a set of one or more custom configured modules based on the custom configuration parameters

450
Generate a set of automatically configured software modules, the set of automatically configured software modules based on default configuration parameters

460
Use the custom configured software modules and the set of automatically preconfigured software modules during the SDLC processes of the user application

FIG. 4

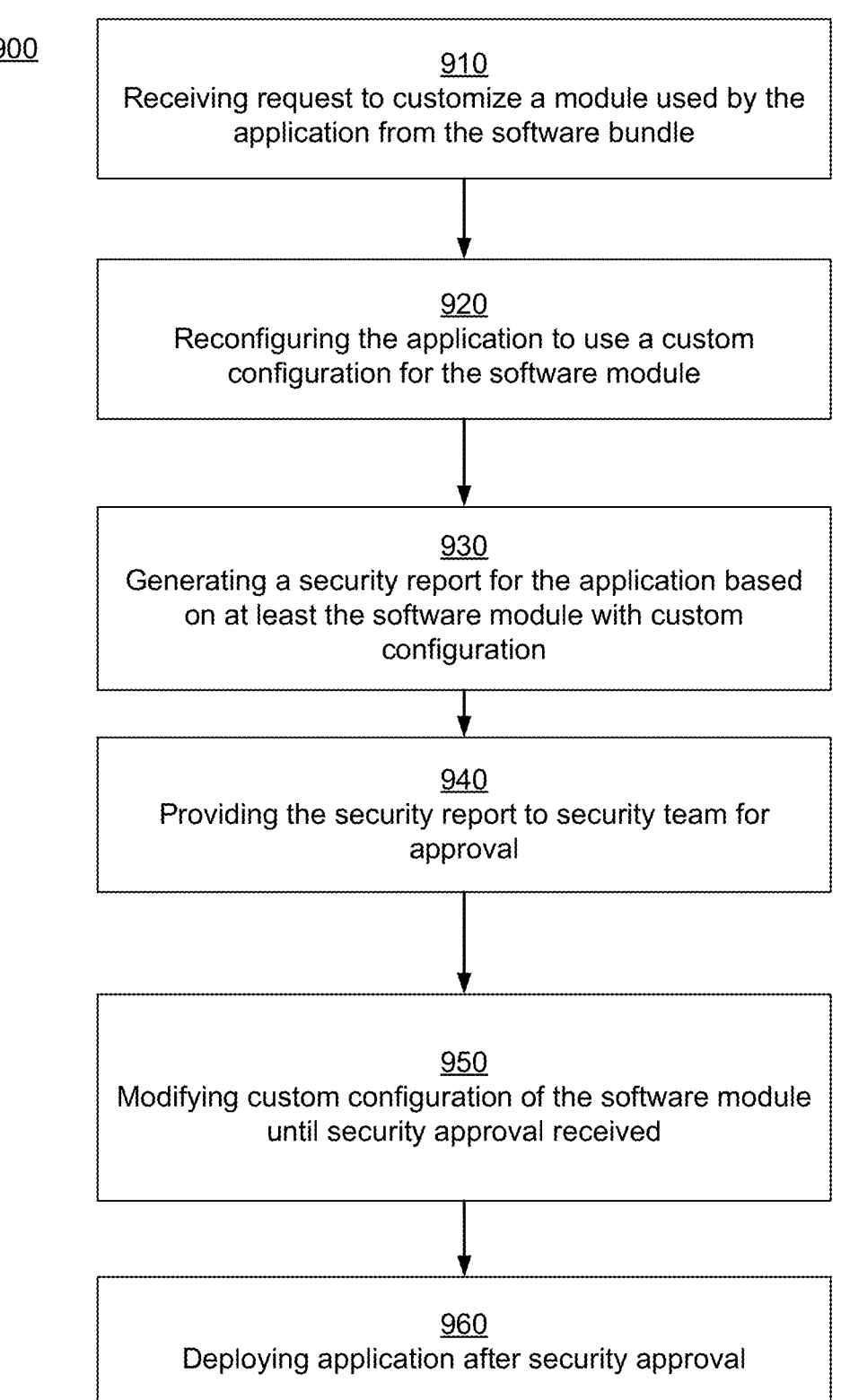

900

910
Receiving request to customize a module used by the application from the software bundle 920
Reconfiguring the application to use a custom configuration for the software module 930
Generating a security report for the application based on at least the software module with custom configuration 940
Providing the security report to security team for approval 950
Modifying custom configuration of the software module until security approval received 960
Deploying application after security approval

FIG. 9

MANAGING SECURITY APPROVAL OF SERVICES DEPLOYED IN CLOUD PLATFORM USING AN EXTENSIBLE PLATFORM AS A SERVICE

CROSS REFERENCE TO RELATED APPLICATIONS

The present application is a continuation of U.S. application Ser. No. 17/589,497, entitled "MANAGING SECURITY APPROVAL OF SERVICES DEPLOYED IN CLOUD PLATFORM USING AN EXTENSIBLE PLATFORM AS A SERVICE," filed Jan. 31, 2022, which claims the benefit of U.S. Provisional App. No. 63/256,046, entitled "EXTENSIBLE PLATFORM AS A SERVICE PLATFORM FOR USE BY MULTIPLE ENTERPRISES," filed Oct. 15, 2021, which is hereby incorporated by reference in its entirety.

BACKGROUND

Field of Art

This disclosure relates in general to security of applications in general, and in particular, to managing security approval of applications using an extensible Platform as a Service (PaaS).

Description of the Related Art

Software application developers within enterprises build systems targeting specific application-specific logic. However, the enterprises have complex software development life cycle (SDLC) processes and trust processes. Furthermore, the underlying infrastructure used by enterprises is constantly evolving. As a result, developers within these enterprises have to address a multitude of issues that arise from the complexities in the SDLC and security processes as well as the evolving infrastructure issues in the course of developing the specific application-specific logic and shipping the resulting code to production. One of the steps in software development life cycle of an application is security approval of new services, for example, services deployed on cloud platforms. Security approval process is typically manual and requires tedious effort on the part of service owners and security teams. Furthermore, as requirements change, service owners forget to request a re-review of their security posture, thereby leading to security risks.

BRIEF DESCRIPTION OF DRAWINGS

FIG. 4 is a flow chart illustrating the process for enabling a use of the extensible PaaS system, according to one embodiment.

FIG. 9 is a flow chart illustrating the process for security approval of an application using custom configurations of software modules of a software bundle, according to one embodiment.

Figure 1:
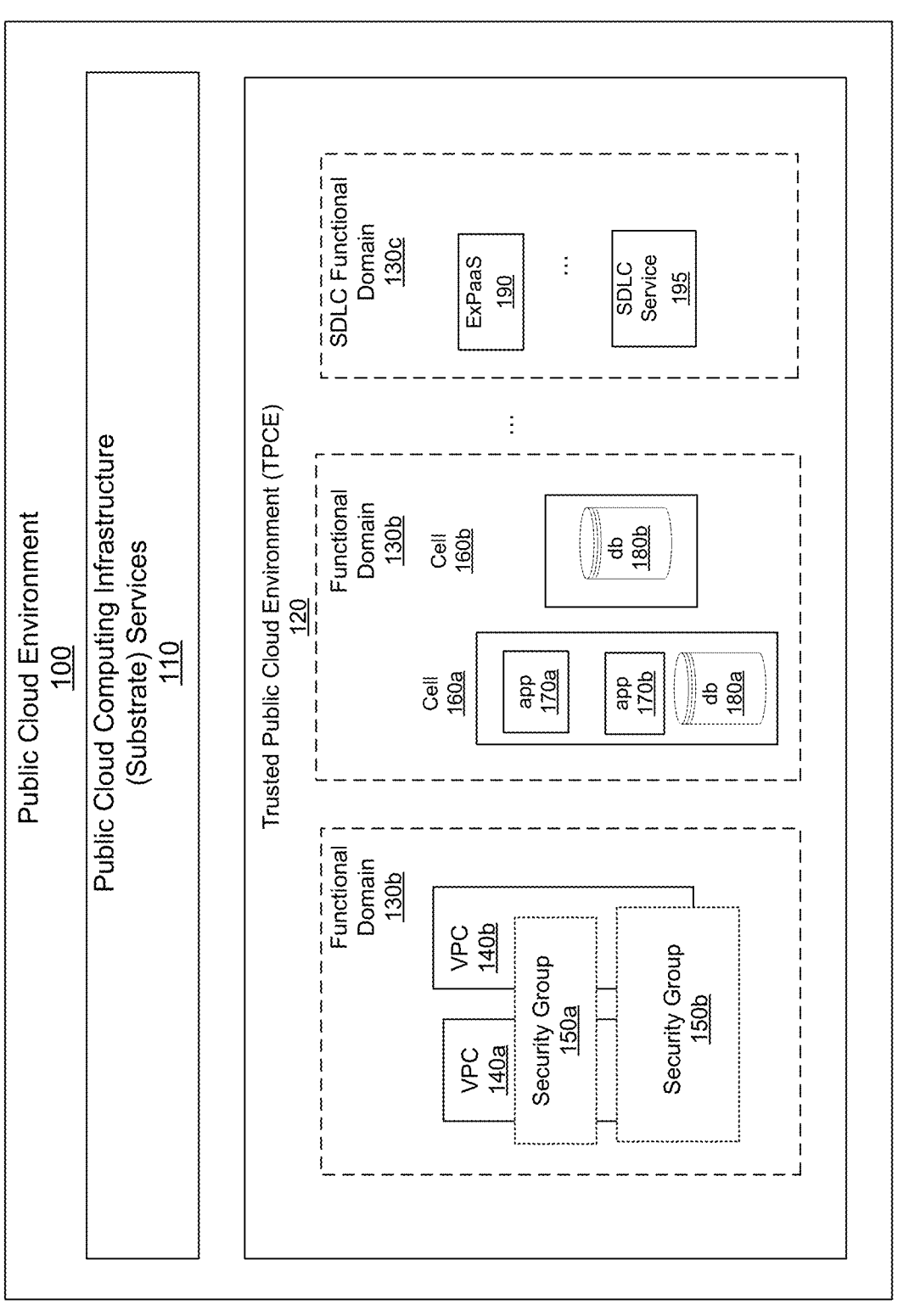
FIG. 1 depicts a block diagram illustrating functional blocks for a trusted public cloud environment that leverages a widely available public cloud environment, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130*a*," indicates that the text refers specifically to the element having that particular reference numeral. A reference numeral in the text without a following letter, such as "130," refers to any or all of the elements in the figures bearing that reference numeral.

DETAILED DESCRIPTION

Large enterprises have several software application developers who are building software modules that are targeting specific application-specific logic. The software modules have complex SDLC processes including various phases such as planning, analysis, design, development, testing, implementation, deployment, maintenance, as well as day to day operations such as releasing new versions of applications to production. Application developers may also be continuously releasing new versions of their applications to production. Furthermore, within each of these phases, there may be built-in security and trust processes.

Applications go through security review before going through various stages of an SDLC process. These include various types of applications, for example, applications deployed on cloud platforms. The security review may be performed manually by security teams. An application developer provides information needed by the security team. The security team reviews the information provided by the application developer to determine whether the application receives security approval for proceeding through subsequent SDLC stages. An application needs to satisfy certain criteria before the application receives security approval. For example, certain components of the application such as containers need to be executed using accounts with specific permissions. Certain versions of software artifacts need to be used for specific modules of the application. Certain software artifacts many be required to include certain patches. The application may be required to use specific database versions or versions of other services invoked by the application. The file system used by the application may be required to have specific file permissions, for example, certain files used by the application may be required to have read only access. The application may be required to use specific communication protocols, for example, secure communication protocols such as HTTPS (Hypertext Transfer Protocol Secure.) The application may be required to have end to end encryption during certain types of interactions. Applications developed for different groups within the organization may require different security constraints. For example, certain groups or teams may have very strict security policies and constraints whereas other groups or teams may have less strict security policies and constraints.

The system, according to various embodiments, includes a repository of software bundles that represent groups of pre-configured software modules. A software bundle may be pre-approved by a security team. Developers developing applications can browse or search through the repository and select one or more software bundles for use in developing the application. If the developer uses a software bundle that is pre-approved by the security team to create an application, the system may automatically provide security approval for that application. Alternatively, the system may generate a security report for review by the security team with recommendation to approve the application with certain caveats. This simplifies the security approval of the application since it minimizes the amount of effort required by the developer to get security approval. Furthermore, the system monitors the development of the application through the various SDLC stages. The system allows the developer to customize one or more software modules of the software bundle if the available configuration is inadequate for the application. Accordingly, if the system determines that the developer modified the configuration of a software module to a configuration that does not have security approval, the system may send an alert to the developer and/or the security team informing the recipient of the change. The system may automatically generate a report noting the modification to the software module and re-request the security team to review the modified configuration for security approval. The system minimizes the effort on the part of the developer since the system automatically generates the report for sending to the security approval team. The system also minimizes the effort on the part of the security team since the system separates the portions of the system configuration that are pre-approved by the security team and the portions that were modified and hence require review by the security team. Accordingly, the system minimizes the portion of the configuration that needs review and improves the efficiency of obtaining security approval.

Overall System Environment

Conventional PaaS systems are based on a cloud computing model where hardware and software tools needed for application development may be provided to the application developers, leaving them free to focus on the application-specific logic development without addressing other SDLC process needs. However, since underlying infrastructure modules may constantly evolving developers may still need to address a multitude of issues during SDLC processes in the course of developing the specific application-specific logic and shipping the resulting code to production. Embodiments described herein describe an extensible PaaS system for use by application developers during various SDLC processes while addressing constantly evolving infrastructure demands.

Embodiments described herein automate the SDLC processes for developer applications using an abstraction model and an extensible PaaS model. Embodiments expose an application program interface (API) to an application developer based on the abstraction model. The application developer may interact with the following features (also termed virtual software resources) in the exposed API: application, artifacts (of the application), environments (in which the application may exist), and the pipeline (defining the flow of the artifacts in the environments). Thus, the abstraction model represents a set of underlying software modules of the extensible PaaS system that may be automatically configured for use during the SDLC processes of the developer/user application with the exception of the few features that are exposed by the API. The features exposed by the API represent minimal configuration required by those abstractions and the rest of the configurations are defaulted or assume some safe defaults. The underlying software modules which are automatically configured are referred to as modules and they may not necessarily map one to one with the APIs. The underlying software modules of the extensible PaaS system may also be termed modules of the extensible PaaS system. The virtual software resources that are exposed by the API are presented to the application developer to configure, and they represent a minimal set of configurations that are required from the developer by the abstraction model; the rest of the configurations are assumed to be configured with safe default values. Additionally, in contrast to conventional PaaS systems, extensibility of the PaaS system is provided to the developer during the SDLC processes of the user application. Embodiments enable developers to select one or more of the underlying software modules (or components) in the extensible PaaS system and either partially custom-configure the selected modules for their specific purposes or replace the selected software modules with developer-customized modules for use in the SDLC processes of the applications. The developer-customized modules may also be incorporated into the abstraction model upon meeting specified security requirements.

An advantage provided by embodiments of the extensible PaaS system described herein is that by providing a means for software application developers to extend the PaaS model by customizing selected modules-either partially or replacing them entirely, the extensible PaaS system allows the application developer to bring their insight in customizing modules. Conventional PaaS systems automatically configure software modules for use by developers. Given that some underlying software modules in a conventional PaaS system may be vendor-locked, it may not be possible to even view all the configurable features in a software module. Conventional PaaS systems do not facilitate customization of the underlying software modules. The extensible PaaS system enables retention of a large portion of the automation needed for efficiently addressing SDLC processes during application development while enabling the developer to still customize a few of the underlying software modules as the underlying infrastructure evolves and as the needs of the application developer evolves. For example, the application developer may have previously wanted continuous deployment (CD) with some default configuration values, but now seeks to custom configure an aspect of the CD system that is not exposed by the API. The extensible PaaS system provides the ability for the application developer to choose and perform such custom configuration of certain underlying modules of the extensible PaaS system.

FIG. 1 shows a block diagram illustrating a trusted public cloud environment (TPCE) 120 that leverages an available public cloud environment (PCE) 100, in accordance with one embodiment. Public cloud environments 100 are owned and operated by third-party providers, and the hardware, software, and supporting infrastructure is also owned and managed by the third-party cloud provider. Examples of public cloud environment 100 include, for example, Amazon Web Services™ (AWS™), Google Cloud Platform™ (GCP™), Azure™, etc.

A public cloud environment 100 offers a range of public cloud computing infrastructure services 110 that may be used on demand by a trusted public cloud environment 120.

Examples of the public cloud computing infrastructure services include servers, storage, databases, networking, security, load balancing, software, analytics, intelligence, and other infrastructure service functionalities. These infrastructure services may be used by the trusted public cloud environment 120 to build, deploy, and manage applications in a scalable and secure manner. The trusted public cloud environment 120 is a trusted public cloud architecture with processing resources, networking resources, storage resources, and other service functionalities with security boundaries that are strictly enforced. An example of a trusted public cloud environment 120 is a datacenter with defined and strictly enforced security boundaries.

The trusted public cloud environment 120 has specific attributes, in accordance with some embodiments. These attributes include attributes required to use available public cloud infrastructure services 110, for example region-specific attributes or environment type specific attributes. Further attributes support security needs, availability expectations, architectural agility coupled with reliability, developer agility, distributed capabilities, and the ability to perform on multiple available public cloud environments.

The trusted public cloud environment 120 may comprise of various instances TPCEI (trusted public cloud environment instances) 125a, 125b, . . . etc. For example, the various instances may be regional instances such as US-west and US-cast, in each of which service owners may run multiple copies of applications to provide for redundancy requirements.

The trusted public cloud environment 120 (or each instance TPCEI 125) may support multiple functional domains 130a, 130b, . . . , 130n. Each functional domain (FD) 130 represents a set of capabilities and features and services offered by one or more computing systems that can be built and delivered independently, in accordance with one embodiment. A functional domain 130 may also be viewed a set of cohesive technical/application-specific use-case functionalities offered by one or more computing systems. A functional domain 130 has strictly enforced security boundaries. A functional domain 130 defines a scope for modifications. Thus, any modifications to an entity—such as a capability, feature, or service—offered by one or more computing systems within a functional domain 130 may propagate as needed or suitable to entities within the functional domain but will not propagate to an entity residing outside the bounded definition of the functional domain 130.

Each functional domain 130 may contain multiple virtual private cloud (VPC) networks, 140a, 140b, . . . , etc. Each virtual private cloud 140 is an on-demand pool of shared resources that are allocated within the functional domain 130 and provide a level of isolation between the users using the resources. VPCs within a functional domain residing within a single public cloud environment may establish connectivity with each other using native multi-VPC network connectivity capabilities available to them via underlying networking infrastructure. For example, native options for multi-VPC network connectivity capabilities include inter-region VPC peering for Amazon Web Service™, inter-region VNet peering for Azure™, and Global VPCs for Google Platform Services™. Connectivity may be provided to two VPCs residing within different PCEs through VPNs. Each functional domain 130 may also contain multiple security groups, 150a, 150b, . . . , etc. Each security group 150 represents a declarative model for enforcing network segmentation. Each security group 150 includes entities with similar risk service profiles collected into a single security group with explicit declarative policy brokering connectivity between the groups.

A functional domain 130 may also contain one or more cells, 160, 160b, . . . , etc. A cell 160 represents a collection of services that scale together, and that may be sharded. These services may be applications 170a, 170b, . . . , etc., and/or databases 180a, 180b, . . . , etc. The applications 170a, 170b, . . . , may individually be developed using embodiments of an extensible PaaS system 190.

In embodiments described herein, an instance of the trusted public cloud environment instance TPCEI 125 may each have an extensible PaaS system, running within TPCE (trusted public cloud environment) instance. In an embodiment, a copy of the extensible PaaS system is executed that deploys applications which can run in development, test, and production environments. This configuration happens in their continuous delivery pipelines using the API. Some embodiments may run multiple copies of the extensible PaaS system. The extensible PaaS system 190 may run in a specific functional domain (FD), for example an SDLC functional domain (or control FD) 130c. The SDLC functional domain 130c represents a group of services that support SDLC including extensible PaaS system 19p and other SDLC services 195. A system administrator or a service owner may specify a functional domain in which the extensible PaaS system is run.

A use-case workflow example of some embodiments of the extensible PaaS system is described below. This is followed by a description of the architecture of embodiments of the extensible PaaS system. Following the architecture description is a description of a flowchart of some of the processes executed by embodiments of the extensible PaaS system described herein.

Extensible Platform-as-a-Service System—A Workflow Example

Figure 2:
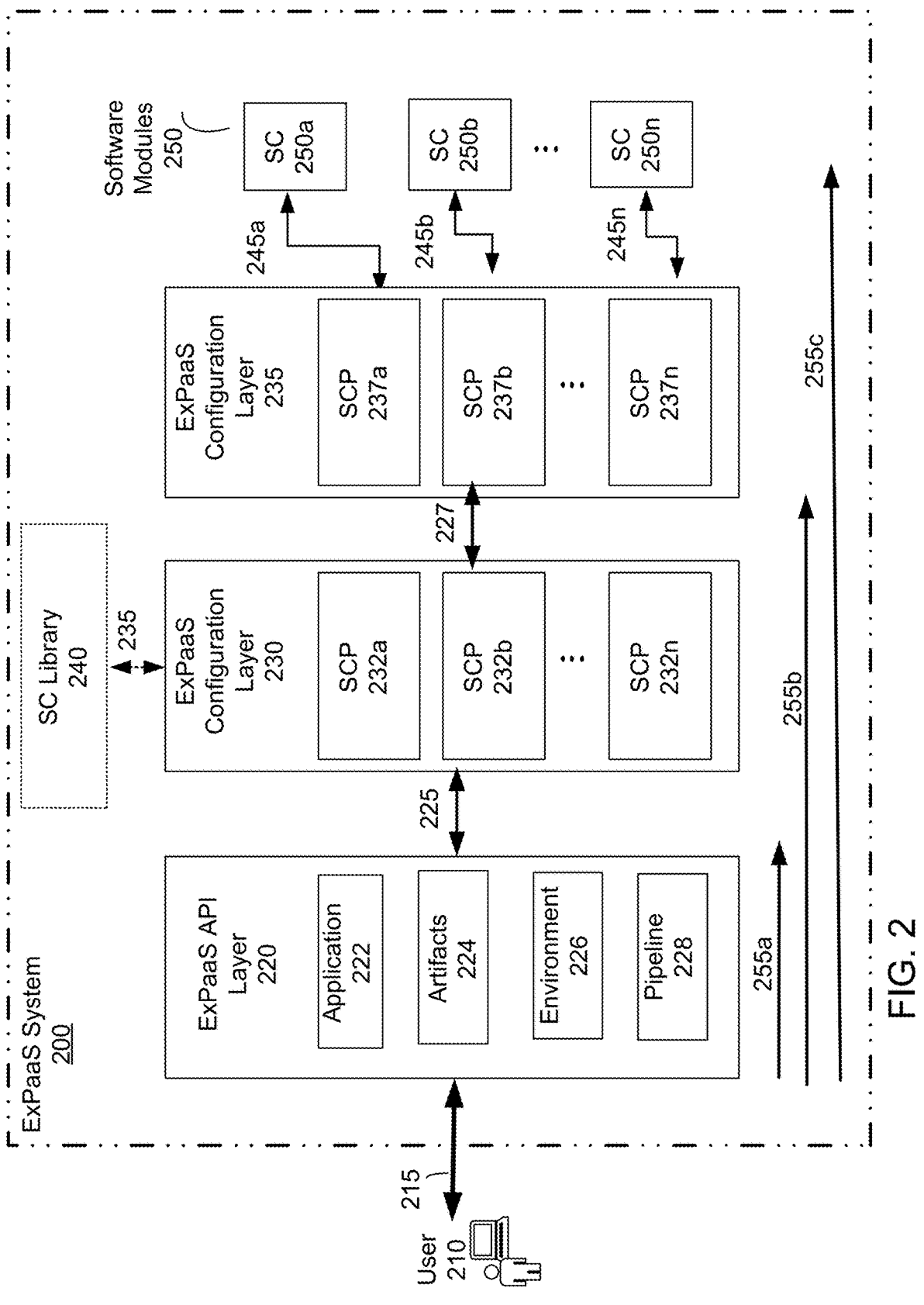
FIG. 2 depicts an exemplary workflow illustrating use of an extensible PaaS system, according to one embodiment.

FIG. 2 depicts a workflow example of using the extensible PaaS system 200, such as exPaaS system 190 as depicted in FIG. 1, in accordance with one embodiment. The example shown in FIG. 2 may be performed in trusted public cloud environments such as trusted public cloud environment 120 that resides within a public cloud environment such as public cloud environment 100 depicted in FIG. 1.

In some embodiments, the exPaaS system 200 includes an exPaaS API layer 220, an exPaaS configuration layer 230, an SC library 240, and a set of underlying software modules 250. A user 210 may be an application developer who interacts 215 with the exPaaS system 200 using an application programming interface (API) that is presented by the exPaas API layer 220.

The exPaaS API layer 220 presents an API to the user 210. Conventional systems have only one PaaS API layer, for example, the layer 220. In contrast extensible PaaS system has multiple layers, for example, layers 230 and 235 in addition to layer 220. The inner layers 230 and 235 of the exPaaS system allow users to expose more complexity of software modules 250 being configured. For example, the user 210 may start with a simple configuration based on exPaaS layer 220 where most of the configurations of the software modules 250 are based on default values and a minimal amount of configuration is exposed by the exPaaS layer 220. A user that wants to expose and modify more details of a particular module, for example, software module 250a may use the inner exPaaS configuration layer 230 for software module 250a but may continue to configure the remaining software modules using the top level exPaaS API layer 220. At a later stage, the user may want to expose and modify more details of another module, for example, software module 250*b* and may use the inner exPaaS configuration layer 230 for software module 250*a* as well as 250*b* but may continue to configure the remaining software modules using the top level exPaaS API layer 220. At some stage, the user may want to expose and modify even more detailed configurations of a software module, for example, 250*a*. The user may accordingly use the exPaaS configuration layer 235 for configuring software module 250*a* while using the exPaaS configuration layer 230 for software module 250*b* and continuing to use the exPaaS layer 220 for remaining modules, e.g., 250*c*, 250*d*, . . . 250*n*.

The presented API encapsulates a simplified abstraction model for automating SDLC processes during application development for the user 210 by exposing only a limited number of features from the set of all possible configurable features of the underlying platform software modules to the user 210. The user 210 may interact 215 with some of the following features in the presented API: application 222, artifacts 224, environments 226, and the pipeline 228. The application 222, artifacts 224, environments 226, and pipeline 228 together expose a set of limited configurable features associated with the user application to the user 210. These are used by the exPaaS system 200 to automatically configure the underlying software modules of the platform for use during the SDLC processes of the user application. In some embodiments, the API presented by the exPaaS API layer 220 may receive 215 values for the exposed features from the user 210. The values from the user may be in the form of source code, data such as name of the application, team name associated with the application developer, environments in which the application may reside (functional domain associated with the application, TCPE instances), code libraries, etc. The API may also receive queries and commands from the user 210 and display the responses to these queries and commands.

The exPaaS configuration layer 230 serves the simplified abstraction model represented by the exPaaS API layer 220 by automatically configuring the underlying software modules for use during the SDLC processes of a user application under development by the user 210. The exPaaS configuration layer 230 may be viewed as including a set of modules SCP 232*a*, SCP 232*b*, . . . , SCP 232*n* that act as proxy software modules with automatically configured configurations that are based on further underlying actual (yet to be configured) software modules 250, i.e., SC 250*a*, SC 250*b*, . . . , SC 250*n*, respectively. The automatically generated configurations generated at the exPaaS configuration layer 230 may be based on the received 225 data values for features from the user 210 at the exPaaS API layer 220. The exPaaS configuration layer 230 may also obtain 235 predefined, default, and security-approved templates from a software module library SC library 240. The required values for the exposed features of application 222, artifacts 224, environment 226, and pipeline 228 provided by the user 210 at the exPaaS API layer 220 and the templates obtained from the SC library 240 at the exPaaS configuration layer 230 are used by the exPaaS system 200 by individually configuring (245*a*, 245*b*, . . . , 245*n*) the software modules 250 to generate a platform of underlying software modules SCP 232 for use in the SDLC processes of the user application.

In addition to the above-described workflow that demonstrates use of a PaaS system to obtain a set of automatically configured underlying software modules during application development, the exPaaS system 200 further enables the user 210 to customize configurations for selected underlying software modules SC 250. This is described below.

The API presented by the exPaaS API layer 220 may receive queries and commands from the user 210. These queries and commands facilitate viewing, by the user 210, of a set of the underlying software modules 250 that form the platform of software modules for use during SDLC processes for application development. The set of the underlying software modules 250 that form the platform of software modules may be presented as a list of software modules to the user 210. The user 210 may select a subset of software modules (e.g., SC 250*a* and SC 250*n* shown in FIG. 2) from the presented list for custom configuration (i.e., the user 210 selects to not use the automatic/default configurations SCP 232*a* and SCP 232*n* for software modules SC 250*a* and SC 250*n* respectively, but instead chooses to actively customize software modules 250*a* and SC 250*n* as desired; however, the user will use the automatically configured SCP 232*b* for software module SC 250*b*).

The exPaaS API layer can be used to customize a subset of modules, for example, a single module, two modules, or more modules. The values of the parameters or attributes that are not customized are automatically determined by the system using best practices and safe default values. Furthermore, depending on the API layer of the exPaaS that is used, the degree of customization of each module may be different (or same). For example, a module SC 250*a* may be customized 255*a* using the exPaaS API layer 220 that allows minimal customization. Another module SC 250*b* or the module SC 250*a* at a later stage during the development may be customized 255*b* to a higher degree using the exPaaS API layer 230. Similarly, another module SC 250*c* or the modules SC 250*a* or 250*b* at a later stage during the development may be customized 255*c* to an even higher degree using the exPaaS API layer 235. The different degrees of customization are illustrated using the arrows 255*a*, 255*b*, and 255*c*.

The exPaaS API layer 220 subsequently may present APIs for receiving custom configuration data from the user 210 for the selected subset of underlying software modules (e.g., for software modules SC 250*a* and SC 250*n*). Thus, the exPaaS system 200 enables the user 210 to use the automatically configured SCP 232*b* along with the custom configured SC 250*a* and SC 250*n* during the SDLC processes of a user application under development. The exPaaS system 200 may enable the user 210 to move between using an automatically configured software module SCP 232 and a custom configured software module 250 at any time during the SDLC processes of a user application under development.

System Architecture

Figure 3:
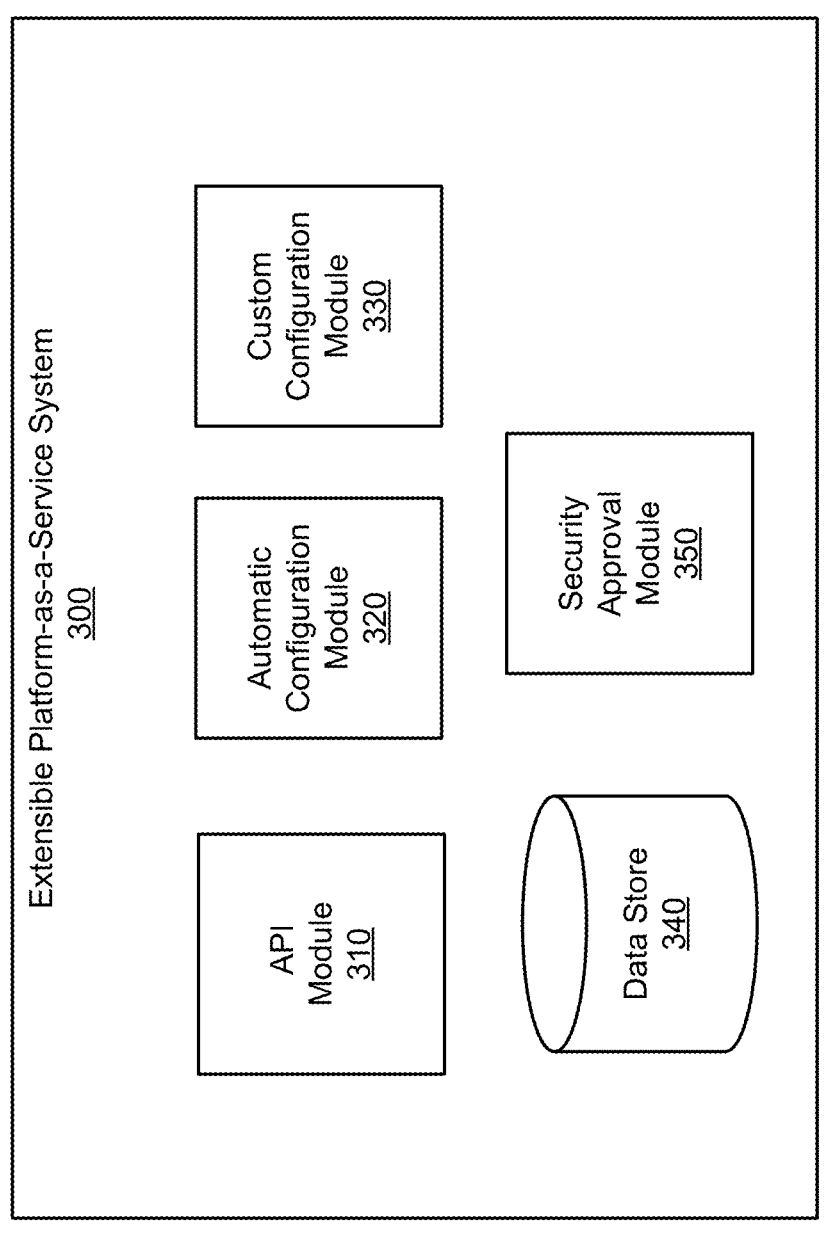
FIG. 3 is a block diagram illustrating modules of an extensible PaaS system, according to one embodiment.

FIG. 3 is a block diagram illustrating modules of the extensible PaaS system 300 according to one embodiment. The extensible PaaS (exPaaS) system 300 includes an API module 310, an automatic configuration module 320, a custom configuration module 330, a data store 340, and a security approval module 350. Alternative configurations of extensible PaaS system 300 may include different and/or additional modules. Functionality that is indicated as being performed by a particular module may be performed by other modules than those indicated herein. Furthermore, steps of any processes described herein can be performed in an order different from that illustrated herein.

The modules of exPaaS system 300 may execute in a trusted public cloud environment such as a trusted public cloud environment 120 that resides within a public cloud environment such as public cloud environment 100 depicted in FIG. 1. The exPaaS system 300 may be used to perform the operational functionalities described in FIG. 2 as being performed by the exPaaS system 200. Instances of the exPaaS system 300 may reside and execute in instances of the trusted public cloud environment such as TPCEI 125 depicted in FIG. 1. Instances of the exPaaS system 300 may be executed by service owners in various environments such as a testing environment and a production environment, etc.

The API module 310 presents an API to a user (e.g., user 210 in FIG. 2). In some embodiments, the API module 310 enables the user to interact with a limited set of features of a simplified abstraction model for the underlying platform of software modules to be used in the SDLC processes during development of a user application. Some of the features in the simplified abstraction model that are exposed to the user through the API include: application (i.e., source code of the application), artifacts (of the application), environments (in which the application may exist), and the pipeline (defining the flow of the artifacts in the environments). The features in the simplified abstraction model exposed to the user through the API represent a small number of the set of all possible configurable features of the underlying platform software modules that may be used during the SDLC processes of the user application. The API module 310 enables the exPaaS system 300 to receive values for these limited set of features from the presented API to the user. The values received from the user may be in the form of, e.g., source code, data such as name of the application, team name associated with the application developer, environments in which the application may reside (functional domain associated with the application, TCPE instances), code libraries, etc. The API may also display, based on the values received for these features, the set of underlying software modules for use during SDLC processes of the user application. The API may also receive one or more requests, queries, and commands from the user and display the responses to these queries and commands. For example, a request from the user may be to display the set of underlying software modules that may be used by the exPaaS system 300 during the SDLC processes of the user applications. Such a request may specify a phase of the SDLC of the user application that the user may be interested in. For example, the user may request to view the underlying software modules that will be used during the "deployment" phase of the SDLC of the user application. In response, among other relevant software modules, the API module 310 may display the Helm™ chart available for use by the user.

The interactions with the exPaaS system are performed using the exPaaS APIs. Various interfaces may be used to invoke APIs exposed by the exPaaS system, for example, graphical user interface or command line interface. For example, the API module 310 may enable a user to use a command line interface (CLI) to invoke and execute the APIs of the exPaaS system 300. For example, a user may invoke and execute a command "expaasctl" along with associated commands and arguments in order to execute an instance of the exPaaS system 300. Some examples of commands that may be used with the CLI may include those shown in Table 1. These commands may further include options (not shown).

TABLE 1

| ExPaaS System - CLI Commands | |
| --- | --- |
| create | create an expaas-based user application from an application name |
| update | update configuration for an expaas-based user application |
| list | list all current expaas-based applications |
| showconfig | print configuration of a specific expaas application |
| show modules | display module metadata for a specific expaas-based application |
| show environments | display target environments of a specific expaas-based application |
| edit | edit expaas-based application configuration |
| . . . | . . . |

An example of the usage of the CLI to invoke and execute the expaasctl command is the following:

>expaasctl app create pvt-messaging-t "pvt-platform" The command creates an application named "pvt-messaging" The-t option may be used with the create command to specify that the user belongs to a particular team "pvt-platform."

Other commands may be used to invoke and execute certain aspects of the exPaaS system 300, including commands to display the set of underlying software modules/components forming the extensible PaaS for the user application, display the environments for the user application, show a configuration for a specific user application, etc. The API module 310 may facilitate the user to query and obtain information about various aspects of the exPaaS system 300 and bring transparency to the user regarding the exPaaS system 300. The API module 310 may execute commands from the user to view a set of the underlying software modules, and in response display a list of software modules. The exPaaS system provides visibility into the defaults and the configurations generated by the system for the underlying modules. The ability to view the defaults allows users to inspect the available possible parameters that can be modified to customize the modules. Accordingly, the exPaaS system allows users to inspect the configurations of modules. In some embodiments, the system provides different modes of inspection. For example, certain mode of inspection may show only the key configuration parameters, another mode of inspection may show a larger set of configuration parameters, and a third mode of inspection may show all configuration parameters. Users may select the mode of inspection depending on their level of sophistication and understanding of the system and the extent to which they want to customize the system.

The API module 310 may receive a selection of software modules from the user that may form a selection of software modules that the user would prefer to customize. The API module 310 may receive an indication from the user of a selection of software modules that will be partially configured by the user (i.e., only some features in these modules will be configured by the user). The API module 310 may forward the received indication to the automatic configuration module 320 and the custom configuration module 330. Subsequently, the API module 310 may receive instructions from the custom configuration module 330 regarding exposing features of the selected software modules for custom configuration by the user. The API module 310 may receive an indication from the user of a selection of software modules that will be replaced by corresponding user-provided software modules, i.e., custom versions of these software modules from the user (e.g., the user's customized Helm™ chart, the user's customized Spinnaker™ pipeline, etc.). The API module 310 may forward the received indication to the automatic configuration module 320 and the custom configuration module 330. Subsequently, the API module 310 may receive instructions from the custom configuration module 330 regarding uploading selected customized software modules from the user.

The automatic configuration module 320 represents a simplified abstraction model for automating SDLC processes during application development for the user. The module 320 automatically configures underlying software modules available for use by the user application during the SDLC processes. The automatic configuration is based on the values received for the exposed features of the simplified abstraction model (i.e., application, artifacts, environment, and pipeline) provided by the user. In addition, the automatic configuration module 320 may obtain templates from a software module library (e.g., SC library 240 in FIG. 2) that may be stored in the data store 340. In some embodiments, for example, the automatic configuration module 320 may provide the user with following configured software modules, such as:

a configured git™ repository—to track all changes made to files associated with the user application basic program templates in a default language such as Java™ configured test programs that are security approved a configured Helm™ chart for creating containerized applications a configured Jenkins™ pipeline for CI a configured Spinnaker™ pipeline for CD etc.

For example, when the CLI command:

>expaasctl app create pvt-messaging-t "pvt-platform"

is executed, the automatic configuration module 320 automatically configures several features for the underlying software modules. An example of configured values for some features are shown below. The user may view configuration specifics by executing the showconfig command (see Table 1 and example below): Show Configuration Example:

>expaasctl app showconfig pvt-messaging
appType: scone-app
gusProductTag: Pvt-Messaging
livenessProbe:
   containerPort: 7080
   path:/actuator/health/liveness
org: my-service-org-name
ports:
   name: http
      port: 7442
      type: Internal
   name: http-admin
      port: 7080
      type: Internal
readinessProbe:
   containerPort: 7080
   path:/actuator/health/readiness
replicas: 1
repoName: pvt-messaging
resourceLimits:
   cpuLimit: "8"
   cpuRequest: "4"
   memoryLimit: 16G
   memoryRequest: 16G teamEmail: pvtplatform@mycompany.com
teamName: PVT Platform Similarly, the user may view environment specifics by executing the showenvironments command (see Table 1 and example below):

>expaasctl app showenvironments pvt-messaging
environments:
   environmentTargets:
      envtype-region: dev1-uswest
         functionalDomainInstance: cooperative-domain
         serviceInstances:
         cells:
            instanceName: plat1
               type: cooperative-domain-cell
            instanceName: shar1
               type: cooperative-domain-cell
            instanceName: serv1
               type: cooperative-domain-cell
      envtype-region: test1-uswest
         functionalDomainInstance: cooperative-domain
         serviceInstances:
         cells:
            instanceName: pvt11
               type: cooperative-domain-cell
            instanceName: stmfa
               type: cooperative-domain-cell
            instanceName: stmfb
               type: cooperative-domain-cell
            instanceName: stmfc
               type: cooperative-domain-cell
            instanceName: stmu
               type: cooperative-domain-cell
            instanceName: stmpa
               type: cooperative-domain-cell
      envtype-region: perf1-useast
         functionalDomainInstance: cooperative-domain
         serviceInstances:
         cells:
            instanceName: perf1
               type: cooperative-domain-cell One or more of the names, values, fields, and parameters shown in the above examples may be replaced by different names, values, fields, and parameters during the automatic configuration performed by the automatic configuration module 320 in various embodiments of the exPaaS system 300.

The automatic configuration module 320 may receive an indication from the API module 310 that the user has selected a subset of software modules for customized configuration. In one case, the automatic configuration module 330 may receive an indication that a selected subset of underlying software modules will be partially custom configured by the user. In this case, the automatic configuration module 320 may automatically configure only a partial set of features of selected software modules (i.e., the remaining features in these selected modules need to be custom configured by the user). In a second case, the automatic configuration module 320 may receive an indication that a selected subset of underlying software modules will be entirely replaced by the custom version of the selected subset of underlying software modules. In this case, the automatic configuration module 320 may not automatically customize any feature in the selected subset of software modules. The automatic configuration module 320 will ensure that the automatically configured modules are available for use during the SDLC processes of the user application.

The custom configuration module 330 facilitates customization of selected software modules for use during the SDLC processes of a user application by the user. The custom configuration module 330 may receive indications from the API module 310 that the user has selected a subset of underlying PaaS software modules for custom configuration.

In one case, the custom configuration module 330 may receive an indication that a selected subset of underlying software modules will be partially custom configured by the user. In this case, the custom configuration module 330 will instruct the API module 310 to expose features for the selected subset of underlying software modules to the user so that the custom configuration values may be received from the user at the API for any of the exposed features. Subsequently, the custom configuration module 330 will ensure that the selected subset of partially custom configured are fully configured—with the received custom configuration values from the user and with the remaining features automatically configured by the automatic custom configuration module 320.

In a second case, the custom configuration module 330 may receive an indication that a selected subset of underlying software modules will be entirely replaced by the custom version of the selected subset of underlying software modules. The custom configuration module 330 will instruct the API module 310 to enable the user to upload the selected customized software modules. Subsequently, the custom configuration module will integrate the uploaded customized software modules from the user unto the extensible PaaS for use during the SDLC processes of the user application.

In some embodiments, the custom configuration module 330 will enable the user to partially or entirely customize underlying software modules anytime during the SDLC processes of the user application. The custom configuration module 330 will ensure that the custom configured modules are available for use during the SDLC processes of the user application.

The data store 340 stores information for the exPaaS system 300. The stored information may include a library of underlying software modules (e.g., SC library 240 in FIG. 2) that are pre-configured and meet security standards. In some embodiments, the underlying software modules in the library may be tagged with phases of the SDLC processes of a user application where they may be used, and a software module in the library may be tagged with multiple phases, indicating use during the tagged SDLC phases. The stored information may include default parameter values for use by the automatic configuration module 320. The data store 340 may include the git™ repositories in association with various user applications using the exPaaS system 300. In some embodiments, configurations of underlying software modules that have been customized by the user, such as a custom Helm™ chart, a custom Spinnaker™ pipeline, etc., may be stored in the data store 340 for use during the SDLC processes of the user application. In some embodiments, the underlying software modules may be tagged with, possibly overlapping, phases of the SDLC processes. In some embodiments, the custom configured software modules may be made available for use by other application developers.

The data store 340 is a memory, such as a read only memory (ROM), dynamic random-access memory (DRAM), static random-access memory (SRAM), or some combination thereof. In some embodiments, the various modules of the exPaaS system 300 may pass various data values directly to each other. In some embodiments, the various modules of the exPaaS system 300 may store data values in the data store 340 and retrieve data values as needed from the data store 340.

In some embodiments, the data store 340 includes a repository that stores software bundles that represent groups of pre-configured software modules. A software bundle may be reviewed and pre-approved by a security team. Accordingly, the exPaaS system provides pre-packaged and pre-configured software bundles that have already received security approval. If an application uses a software bundle that has security approval, the application does not need to go through the security approval process. For example, the system may automatically grant security approval to the application.

The security approval module 350 either provides automatic security approval for applications being developed or assists with security approval of applications. The security approval module 350 also monitors applications during their SDLC stages and determines whether security approval is required for the application as a result of certain modifications made to the configurations of software modules used by the application. Further details of the system architecture of the security approval module 350 is provided in FIG. 5. Processes executed by the security approval module 350 are illustrated in FIGS. 6-9.

Process Executed by an Extensible Platform-as-a-Service System

FIG. 4 is a flow chart illustrating the overall process executed by an extensible PaaS system 300 (shown in FIG. 3) according to one embodiment. The process illustrated herein is performed by an instance of the exPaaS system 300. Various embodiments can perform the steps of FIG. 4 in different orders than those indicated herein. Moreover, other embodiments can include different and/or additional steps than the ones described herein.

The exPaaS system 300 receives 410, from the user, values for one or more features exposed in an API that is presented to the user. The user may be an application developer who is developing a user application and who will use the exPaaS system 300 during the SDLC processes of the user application. The exposed features may be a limited set of features of a simplified abstraction model for the underlying platform of software modules to be used in the SDLC processes during development of the user application. In some embodiments, some of the features in the simplified abstraction model that are exposed to the user by the exPaaS system 300 may include: application, artifacts (of the application), environments (in which the application may exist), and the pipeline (defining the flow of the artifacts in the environments).

The exPaaS system 300 displays 420 a set of underlying software modules for use during the SDLC processes of the user application. This display may be based on the values received for the features in the simplified abstraction model. In some embodiments, the exPaaS system 300 may receive a request from the user to display the set of underlying software modules. In some embodiments, the user may additionally specify a phase of the SDLC for which the display is requested, and the displayed set of modules may be the software modules that will be used during the specified phase of the SDLC processes of the user application.

The exPaaS system 300 receives 430, from the user, a selection of one or more software modules for custom configuration from the displayed set of software modules. In some embodiments, each of the received selection of software modules may be accompanied by an indication of whether the user desires partial custom configuration of the selected software module or wishes to entirely replace the software module with a custom configured module.

The exPaaS system 300 generates 440 custom configured software modules for the received selection of one or more software modules. In some embodiments, when the received indication is that a module will be partially configured by the user, the exPaaS system 300 presents an API for the indicated software module, and receives, from the user, values for one or more features that are exposed in the presented API for the indicated software module. The system 300 generates the custom configured software module for the indicated module based on the received values from the user. In some embodiments, when the received indication is that a module will be replaced by a corresponding user-provided module (i.e., entirely configured by the user), the exPaaS system 300 presents an interface for uploading, by the user, the corresponding user-provided software module for the indicated software modules. Subsequently, the system 300 generates the custom module based on the uploaded software module.

The exPaaS system 300 generates 450 a set of automatically configured software modules for those modules in the displayed set of software modules that are not in the set of desired custom modules, i.e., the displayed set of software modules from which the received selection of one or more software modules (from the user) is removed.

The exPaaS system 300 uses 460 the set of custom configured software modules and the set of automatically configured software modules during the SDLC processes of the user application.

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs multiple salespersons, where each salesperson uses a client device to manage their sales process. Thus, a user might maintain contact data, leads data, customer follow-up data, performance data, goals and progress data, etc., all applicable to that user's personal sales process.

Security Approval of Applications

Figure 5:
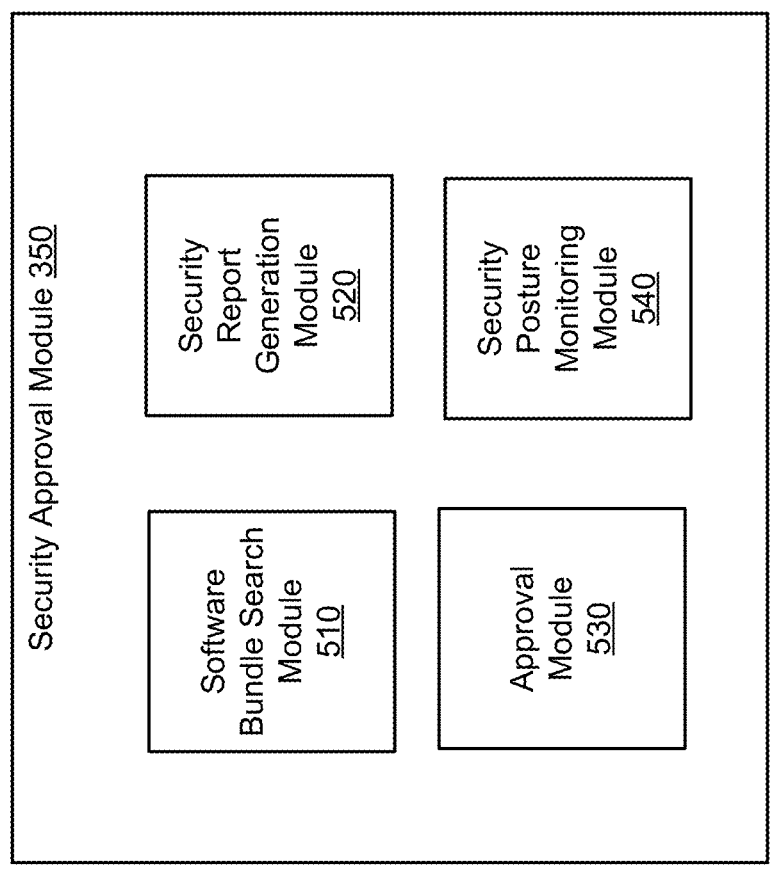
FIG. 5 is a block diagram illustrating system architecture of a security approval module, according to one embodiment.

FIG. 5 is a block diagram illustrating system architecture of a security approval module 350, according to one embodiment. The security approval module 350 includes a software bundle search module 510, a security report generation module 520, an approval module 530, and a security posture monitoring module 540. Alternative configurations of extensible PaaS system 300 may include different and/or additional modules. Functionality that is indicated as being performed by a particular module may be performed by other modules than those indicated herein. Furthermore, steps of any processes described herein can be performed in an order different from that illustrated herein.

The software bundle search module 510 allows users to search for relevant software bundles based on search criteria specified by the users. In an embodiment, the software bundle search module 510 presents users with attributes of the software bundles that the users can specify for filtering a subset of software bundles that can be used for an application being developed. For example, the user may be able to specify a type of file system access, a type of communication used by software modules, the version of software artifacts used, the programming language used for development, the type of application (e.g., web application, application with graphical user interface, online application, and so on), and other attributes. The software bundle search module 510 receives the search criteria and filters a subset of software bundles that satisfy the search criteria. An application developer may review the received software bundles to select a particular software bundle to use. The application developer may select a particular software bundle that satisfies most of the requirements but may perform reconfiguration of certain modules to meet additional requirements.

The approval module 530 reviews the selections of software bundles by the user for application development and determines whether all the software bundles selected by the user have security approval. If all software bundles used by the application have security approval, the approval module 530 may either give automatic security approval to the application or send a request for granting automatic security approval to a security team member.

The security report generation module 520 generates a report of the configurations used by an application, for example, for presenting to a security team member for review. The security report includes the information necessary for a security team member to review the application in view of security approval. For example, the security approval may include information describing the type of communication protocols used in the software bundles selected by the developer for the application, the attributes of file systems used by the software bundle, versions of software artifacts used in the software bundles and so on. If a user decides to customize a particular software module and customize the software module by reconfiguring it to suit the specific needs of the application, the security report generation module 520 includes information describing the customizations. Accordingly, the security report generation module 520 includes all the information needed by the security team to review the application to determine whether security approval can be granted.

The security posture monitoring module 540 monitors changes to the application during various SDLC stages. For example, a developer may start development with a software bundle that has security approval and as a result gets automatic security approval for the application. However, during the development process, the developer may customize a particular software module of the software bundle. The security posture monitoring module 540 tracks all such changes and if a change to the configuration is performed by the developer that requires further security approval, the security posture monitoring module 540 may alert the developer and/or the security team of the change. The security posture monitoring module 540 may further invoke the security report generation module 520 to generate a security report and provide it to a security team member for review. The security team member may review the generated report and determine whether the application should be granted security approval in spite of the customization of the component.

Figure 6:
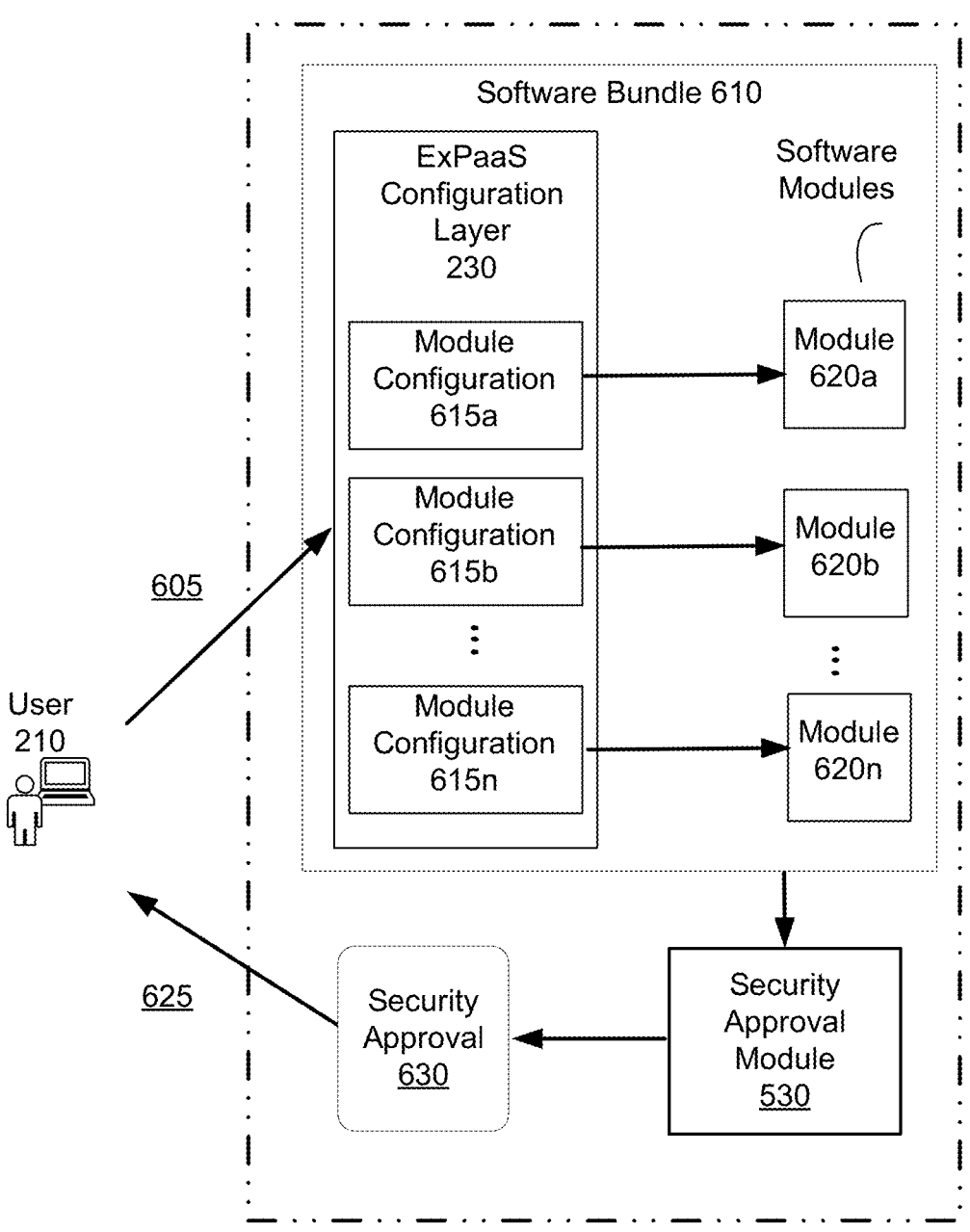
FIG. 6 illustrates the process of security approval for an application, according to an embodiment.

FIG. 6 illustrates the process of security approval for an application, according to one embodiment. FIG. 6 shows an example software bundle 610 that is used for development of an application. The software bundle 610 includes configurations of a set of modules. For example, the software bundle 610 shown in FIG. 6 includes software module configuration 615a for software module 620a, software module configuration 615b for software module 620b, and so on including software module configuration 615n for software module 620n. The example software bundle 610 shows software configurations that are all pre-approved for security purposes. The user 210, for example, a developer of an application identifies one or more software bundles for use for a new application being developed for a cloud platform and selects 605 the software bundle 610 for use. The security approval module 530 tracks the application being developed and determines whether all the software modules of the software bundle 610 being used have security approval. If the security approval module 530 determines that all the software modules of the software bundle have security approval, the security approval module 530 automatically grants 625 security approval to the application. Accordingly, the user 210 can proceed with the various SDLC stages for the application and taking the application to production.

Figure 7:
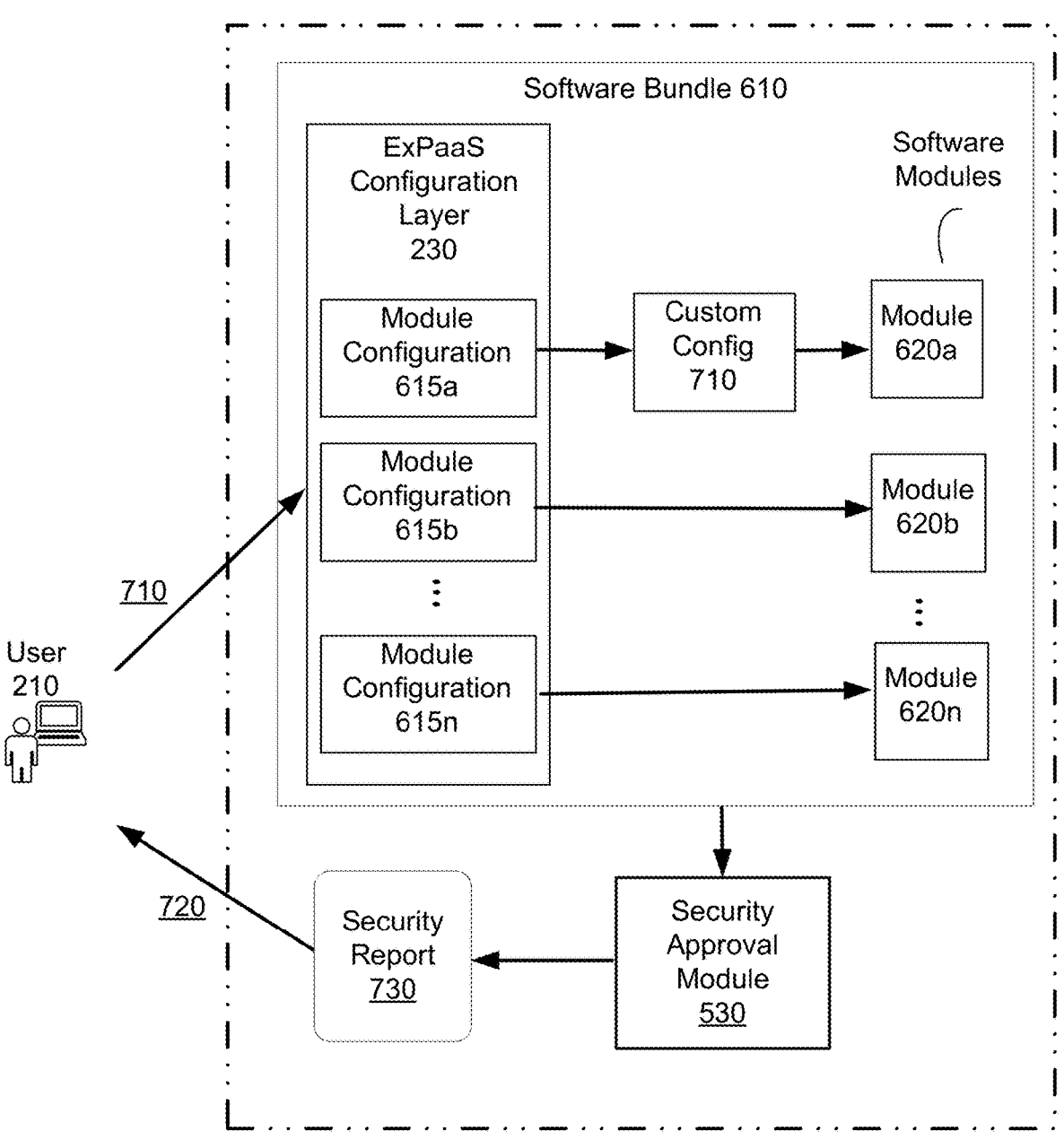
FIG. 7 illustrates the process of security approval for an application with custom configuration of one or more software modules, according to an embodiment.

FIG. 7 illustrates the process of security approval for an application with custom configuration of one or more software modules, according to an embodiment. The user, for example, the developer of an application may start with a configuration illustrated in FIG. 6. For example, the user may start development of the application using a software bundle 610 that has security approval for all software modules included in the software bundle 610. As the development proceeds, the user may realize that the module configuration of at least a software module, for example, the module configuration 615a of the software module 620a is different from the configuration needed for the application being developed. The user invokes one or more API of the exPaaS system to customize the configuration of the software module 620a. The process of customizing a software module of a software bundle is also referred to herein as off-roading, i.e., departing from the recommended path for the software module. The APIs invoked for customizing the software module 620 generate a custom configuration 710 for the software module 620a. The exPaaS system tracks the custom configuration and uses the custom configuration for software module 620a instead of the module configuration 615a originally packaged with the software bundle 610. For all remaining software modules, for example, software modules 620b, . . . , 620n, the exPaaS system continues to use the module configuration 615b, . . . , 615n that were initially included with the software bundle 610 until the user decides to customize any of the remaining software modules. If the exPaaS system receives a request for customizing a software module, the security approval module 530 may send an alert or a message to the user 210 informing the user that the customization will require further security approval. The alert or message may also be sent to a user from the security team. The security approval module 530 may further generate a security report 730 that identifies any software modules that were customized and therefore do not have security approval of the security team or need further approval. The user 210 may not be able to proceed with certain SDLC stages until the application receives a security approval based on the security report 730. For example, the user may not be able to promote the application to be deployed in a production environment until security approval is received. Once the exPaaS system receives security approval for the custom configuration 710 of the software module 620a, the exPaaS system allows the application to proceed with subsequent SDLC stages.

In an embodiment, the exPaaS system generates a new software bundle including one or more custom configuration of software modules. Since a developer customized the software module 620a, the exPaaS system determines that there may be other developers interested in the customized configuration. The exPaaS system includes the new software bundle in the repository of software bundles and provides the software bundle as an alternative in subsequent user searches. According to an embodiment, the exPaaS system tracks the usage of the new software bundle over a time interval. If the exPaaS system determines that more than a threshold number of applications used the new software bundle, the exPaaS system keeps the new software bundle. If the number of applications using the new software bundle is below a threshold number, the exPaaS system 200 may remove the new software bundle or deprecate it. This process allows the system to grow the software bundle repository based on user contributions as well deprecate less frequently used versions, hence improving the security posture, since the system has to maintain less number of software bundles.

Figure 8:
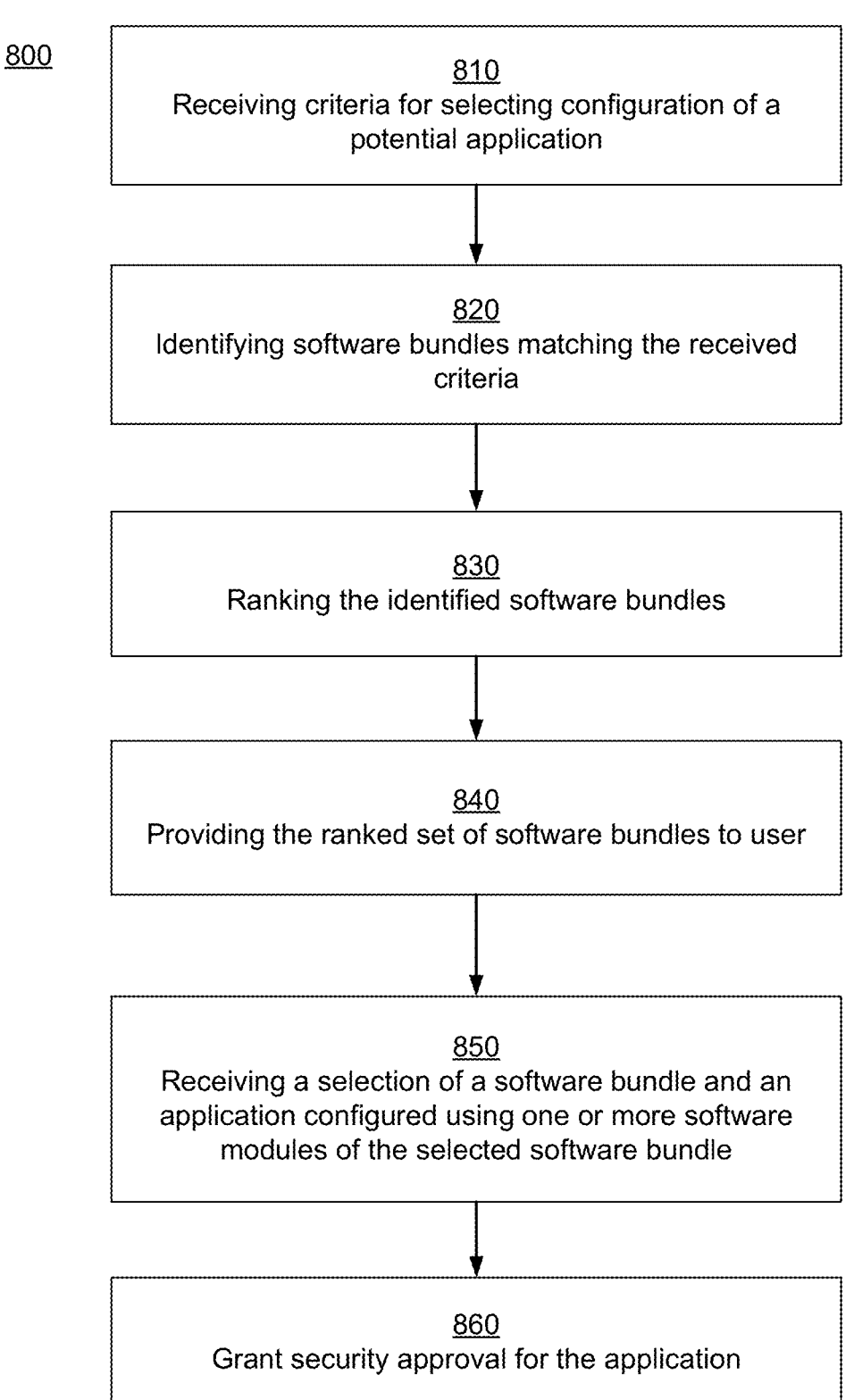
FIG. 8 is a flow chart illustrating the process for security approval of an application using software bundles provided by the exPaaS system, according to one embodiment.

FIG. 8 is a flow chart illustrating the process for security approval of an application using software bundles provided by the exPaaS system, according to one embodiment. The exPaaS system 200 receives 810 a search criteria for selecting configuration of a potential application being developed. The search criteria may be received via a user interface of a search application presented to the users. The search criteria may specify various attributes of the application including a programming language for development of the application, a version of a software artifact used by the application, a communication protocol used for communications by a software module used by the application, or an access permission of a file system used by the application.

The exPaaS system 200 searches through the repository of software bundles to identify one or more software bundles matching the received criteria. The exPaaS system 200 may rank the received software bundles based on various factors including the number of criteria that are satisfied by a software bundle, historical usage of the software bundle (i.e., a number of applications that have previously used the software bundles, and so on. Another factor used for ranking the software bundles is a number of security issues associated with software applications that used the software bundle. Another factor used for ranking the software bundles is a type of security issues indicating the severity of security issues associated with software applications that used the software bundle.

The exPaaS system 200 provides 840 users with a ranked list of software bundles, for example, via a user interface of the search application. The exPaaS system 200 receives 850 a selection of a software bundle from the ranked list. The exPaaS system 200 also receives information describing the application being developed using the selected software bundle. The exPaaS system 200 determines whether all the software modules of the software bundle have security approval. If the exPaaS system 200 determines that the application is using all the software modules of the selected software bundle without any modification or customization, the exPaaS system 200 grants 860 security approval for the application automatically. According to an embodiment, the exPaaS system 200 generates a recommendation to grant security approval to the application and send the recommendation to one or more users, for example, members of a security team. The exPaaS system 200 grants security approval to the application responsive to receiving an approval from one or more users of the security team.

FIG. 9 is a flow chart illustrating the process for security approval of an application using custom configurations of software modules of a software bundle, according to one embodiment. The exPaaS system 200 receives 910 requests to customize a module of a software bundle used by the application. Accordingly, the developer decides to off-road a particular software module rather than use the configuration that is readily available in the software bundle. The exPaaS system 200 reconfigures 920 the application to use a custom configuration as specified by the developer. The exPaaS system 200 may receive details of the custom configuration from the developer and apply them to the software module.

The exPaaS system 200 determines that the application is not conforming to the configuration provided by the software bundle and accordingly prepares to send a message or alert to the developer and/or the security team informing them that security approval is needed as a result of the customization. The exPaaS system 200 generates 930 security report for the application. The security report identifies the software module that is customized and may provide description of the customization. According to an embodiment, the exPaaS system 200 includes in the security report a difference between the approved configuration of the software module that is included in the software bundle and the customized configuration so that the reviewer can identify the differences easily.

The exPaaS system 200 provides the generated security report to members of the security team for review. The security team may approve the customized configuration or request further modifications needed for approval. The exPaaS system 200 may receive requests to modify 950 the custom configuration of the software module. This process may continue until security approval is obtained from the security team. The exPaaS system 200 may deploy the application after the security approval is received for all customized modules of the software bundle used by the application.

In some embodiments, the system may detect a security vulnerability in a software bundle. In this situation, the system (for example, the security approval module), automatically and efficiently identifies all the applications that are using that software bundle and have not customized it. The security approval module automatically sends the owners or users of those applications, notifications with instructions on how to fix the security vulnerability including deadlines and any other information necessary to make an informed decision. Also, if the application remains non-compliant, the system may remove the application from the SDLC process and/or automatically apply new patches to those applications or use a newer version of a software module that does not have security vulnerability after a threshold time interval (e.g., after certain deadline is passed) while ensuring that the application satisfies any requirements or constraints specified by the developer (or the application owner). Accordingly, the use of software bundles by the exPaaS system allows the system to automatically detect applications with security vulnerabilities as well as automatically fix security vulnerabilities if possible, by applying patches or using appropriate version of the software module determined to have a security vulnerability. A security vulnerability refers to a known security issue in the software module or software bundle, for example, a defect or a feature that allows an unauthorized user to gain access to the system or allow a user to perform an action that the user is not allowed to perform using the system.

Computer Architecture

Figure 10:
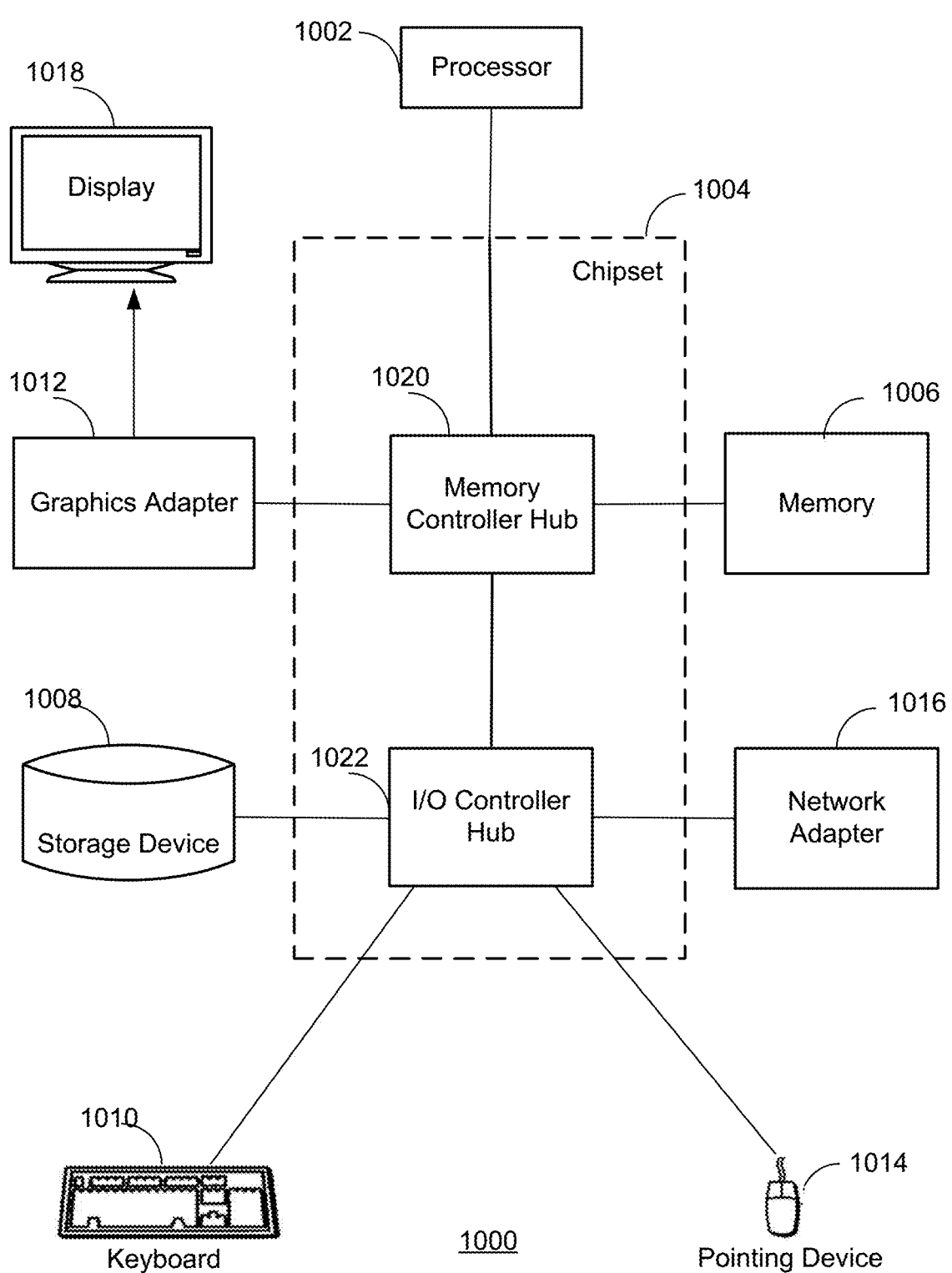
FIG. 10 is a block diagram illustrating the architecture of a typical computer system for use in the environments disclosed herein, according to one embodiment.

FIG. 10 is a block diagram illustrating the architecture of a typical computer system 1000 for use in the environments disclosed herein according to one embodiment. Illustrated are at least one processor 1002 coupled to a chipset 1004. Also coupled to the chipset 1004 are a memory 1006, a storage device 1008, a keyboard 1010, a graphics adapter 1012, a pointing device 1014, and a network adapter 1016. A display 1018 is coupled to the graphics adapter 1012. In one embodiment, the functionality of the chipset 1004 is provided by a memory controller hub 1020 and an I/O controller hub 1022. In another embodiment, the memory 1006 is coupled directly to the processor 1002 instead of the chipset 1004.

The storage device 1008 is a non-transitory computer-readable storage medium, such as a hard drive, compact disk read-only memory (CD-ROM), DVD, or a solid-state memory device. The memory 1006 holds instructions and data used by the processor 1002. The pointing device 1014 may be a mouse, track ball, or other type of pointing device, and is used in combination with the keyboard 1010 to input data into the computer system 1000. The graphics adapter 1012 displays images and other information on the display 1018. The network adapter 1016 couples the computer system 1000 to a network.

As is known in the art, a computer system 1000 can have different and/or other modules than those shown in FIG. 10. In addition, the computer system 1000 can lack certain illustrated modules. For example, a computer system 1000 acting as an online system 300 may lack a keyboard 1010 and a pointing device 1014. Moreover, the storage device 1008 can be local and/or remote from the computer 1000 (such as embodied within a storage area network (SAN)).

The computer system 1000 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1008, loaded into the memory 1006, and executed by the processor 1002.

The types of computer systems 1000 used by the system of FIG. 3 can vary depending upon the embodiment and the processing power used by the entity. For example, a client device may be a mobile phone with limited processing power, a small display 1018, and may lack a pointing device 1014. The online system 400 in contrast, may comprise multiple blade servers working together to provide the functionality described herein.

Additional Considerations

The particular naming of the modules, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system modules described herein is merely exemplary, and not mandatory; functions performed by a single system module may instead be performed by multiple modules, and functions performed by multiple modules may instead performed by a single module.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A method, comprising:

receiving, by a computer system from a user, a configuration of an application based on one or more software modules of a first software bundle, wherein the one or more software modules received security approval;

responsive to determining that none of the one or more software modules included in the first software bundle have been customized, the computer system automatically granting security approval to the application;

monitoring, by the computer system, software development life cycle (SDLC) processes of the application, wherein the monitoring includes determining whether the one or more software modules have been customized;

in response to determining that at least one software module of the one or more software modules has been customized for the application, the computer system generating a request for security approval;

sending, by the computer system, the generated request for security approval;

providing, by the computer system, a second software bundle having the one or more software modules, including one or more modifications made to the at least one software module;

tracking, by the computer system, usage of the second software bundle over a period of time; and based on the tracking indicating that a number of applications configured with the second software bundle does not satisfy a threshold condition, the computer system deprecating the second software bundle.

2. The method of claim 1, further comprising:

implementing, by the computer system, an application programming interface (API) that allows users to customize configurations of software modules, wherein the API tracks modifications made to configurations of the one or more software modules of the first software bundle.

3. The method of claim 1, further comprising:

in response to determining that the at least one software module has been customized, the computer system generating a report that identifies a set of differences between an approved configuration of the at least one software module and a customized configuration of the at least one software module, wherein the report is sent with the generated request for security approval.

4. The method of claim 1, further comprising:

in response to determining that the at least one software module has been customized, the computer system preventing the application from proceeding through one or more SDLC stages until security approval is received, wherein the one or more SDLC stages include a stage in which the application is deployed in a production environment; and after the sending of the generated request for security approval and in response to the security approval being received for the application, the computer system permitting the application to proceed through the one or more SDLC stages.

5. The method of claim 1, further comprising:

determining, by the computer system, that a particular software module of the first software bundle has a security vulnerability;

identifying, by the computer system, one or more applications, including the application, that are configured with the first software bundle;

sending, to entities managing the one or more applications, alerts about the security vulnerability; and automatically applying a software patch to the particular software module to fix the security vulnerability for the one or more applications.

6. The method of claim 1, further comprising:

receiving, by the computer system, a request to identify software bundles that satisfy criteria identified by the request, wherein the criteria identify a programming language for development of the application; and presenting, by the computer system to an issuer of the request, one or more software bundles that satisfy the criteria, wherein the one or more software bundles include the first software bundle.

7. A non-transitory computer readable medium having program instructions stored thereon that are capable of causing a computer system to perform operations comprising:

receiving a configuration of an application based on one or more software modules of a first software bundle, wherein the one or more software modules received security approval;

responsive to determining that none of the one or more software modules included in the first software bundle have been customized, automatically granting security approval to the application;

monitoring software development life cycle (SDLC) processes of the application, wherein the monitoring includes determining whether the one or more software modules included in the first software bundle have been customized;

in response to determining that at least one software module of the one or more software modules has been customized, generating a request for security approval;

sending the generated request for security approval;

providing a plurality of users with access to a second software bundle having the one or more software modules, including one or more modifications made to the at least one software module;

tracking usage of the second software bundle over a period of time; and based on the tracking indicating that a number of applications configured with the second software bundle does not satisfy a threshold condition, ceasing to provide the plurality of users with access to the second software bundle.

8. The non-transitory computer readable medium of claim 7, wherein the operations further comprise:

implementing an application programming interface (API) that allows users to customize configurations of software modules, wherein the API tracks modifications made to configurations of the one or more software modules of the first software bundle; and in response to determining that the at least one software module has been customized, generating a report having information that describes one or more modifications made to the at least one software module via the API, wherein the report is sent with the generated request for security approval.

9. The non-transitory computer readable medium of claim 7, wherein the operations further comprise:

in response to determining that the at least one software module has been customized, preventing the application from being deployed in a production environment; and after the sending of the generated request for security approval and in response to the security approval being received for the application, deploying the application in the production environment.

10. The non-transitory computer readable medium of claim 7, wherein the operations further comprise:

determining that a particular software module of the first software bundle has a security vulnerability;

identifying one or more applications including the application configured with the first software bundle; and sending, to one or more developers associated with the one or more applications, alerts about the security vulnerability.

11. The non-transitory computer readable medium of claim 7, wherein the operations further comprise:

receiving a request to identify software bundles that satisfy criteria identified by the request, wherein the criteria identify a communication protocol for communications associated with the application; and presenting, to an issuer of the request, one or more software bundles that satisfy the criteria, wherein the one or more software bundles include the first software bundle.

12. A system, comprising:

at least one processor; and a memory having program instructions stored thereon that are executable by the at least one processor to cause the system to perform operations comprising:

receiving a configuration of an application based on one or more software modules of a first software bundle, wherein the one or more software modules received security approval;

responsive to determining that none of the one or more software modules included in the first software bundle have been customized, automatically granting security approval to the application;

monitoring the application as the application proceeds through software development life cycle (SDLC) stages, wherein the monitoring includes determining whether the one or more software modules included in the first software bundle have been customized;

in response to determining that at least one software module of the one or more software modules has been customized, generating a request for security approval;

sending the generated request for security approval;

providing a plurality of users with access to a second software bundle having the one or more software modules, including one or more modifications made to the at least one software module;

tracking usage of the second software bundle over a period of time; and based on the tracking indicating that a number of applications configured with the second software bundle does not satisfy a threshold condition, ceasing to provide the plurality of users with access to the second software bundle.

13. The system of claim 12, where the operations further comprise:

in response to determining that the at least one software module has been customized, preventing the application from being deployed in a production environment; and after the sending of the generated request for security approval and in response to the security approval being received for the application, deploying the application in the production environment.

14. The system of claim 12, where the operations further comprise:

in response to determining that the at least one software module has been customized, generating a report that identifies a set of differences between an approved configuration of the at least one software module and a customized configuration of the at least one software module, wherein the report is sent with the generated request for security approval.

15. The system of claim 12, where the operations further comprise: receiving, from a user, a request to identify software bundles that satisfy criteria identified by the request, wherein the criteria identify a version of a software artifact associated with the application; and presenting, to the user, one or more software bundles that satisfy the criteria, wherein the one or more software bundles include the first software bundle.

* * * * *